3,128,304
CYCLODODECADIENOLS AND THEIR ESTERS
Pierre Lafont, Lyon (Rhone), France, assignor to Societe des Usines Chimiques Rhone-Poulenc, Paris, France, a French body corporate
No Drawing. Filed Feb. 16, 1961, Ser. No. 89,633
Claims priority, application France Feb. 20, 1960
4 Claims. (Cl. 260—487)

This invention relates to new unsaturated cycloaliphatic alcohols and their esters and to methods for the preparation thereof.

It is known that cyclododeca-1,5,9-triene, which has been obtained by trimerization by butadiene by Wilke (Angew. Chemie 69, 397 (1957)), is composed of two isomers of which one, which is liquid, has the trans-trans-cis configuration and the other, which melts at 34° C., has the trans-trans-trans configuration.

It has now been found that these compounds react with organic acids to give a mixture of esters from which there can be isolated monoesters which, on saponification, give mixtures of stereoisomeric cyclododeca-5,9-dien-1-ols.

According to one feature of the present invention there are provided as new chemical compounds the cyclododeca-5,9-dien-1-ols and their esters with organic acids.

According to another feature of the present invention there is provided a process for the preparation of cyclododeca-5,9-dien-1-ols and their esters with organic acids which comprises reacting a cyclododeca-1,5,9-triene with an organic acid to obtain an ester and, when the corresponding alcohol is required, saponifying the said ester.

When the aforesaid cyclododecatriene of trans-trans-trans configuration is used as starting material, a well-defined monoalcohol is obtained, which is cyclododeca-5,9-dien-1-ol of trans-trans configuration. This alcohol has a melting point of 65 to 66° C. and its phenylurethane derivative melts at 135 to 136° C. On exhaustive hydrogenation, the alcohol is converted into cyclododecanol.

If the trans-trans-cis-cyclododecatriene is used as starting material, a mixture of cyclododecadienols is obtained from which can be isolated an alcohol identical with that obtained from the trans-trans-trans-cyclododecatriene. It is thought that this alcohol is formed due to the reaction of the cis double bond in the starting material. The mixture contains another monoalcohol fraction which is a mixture of cyclododeca-5-trans-9-cis-dien-1-ol and cyclododeca-5-cis-9-trans-dien-1-ol which is believed to be formed due to the action of the trans double bonds. This second fraction is liquid, gives no solid phenylurethane derivative and on hydrogenation also gives cyclododecanol.

In addition to the alcohols obtained by the foregoing processes, there is obtained, regardless, of the triene employed, a fraction of alcohols whose weight analysis corresponds to the empirical formula $C_{12}H_{20}O$ and whose unsaturation is low. This fraction probably consists of polycyclic monoalcohols containing 12 carbon atoms.

Organic acids which may be employed in the process of the invention are, for example, saturated or unsaturated aliphatic acids, which may be halogenated, and cycloaliphatic and aromatic acids. Formic acid, acetic acid and trifluoroacetic acid are particularly suitable for the preparation of monoesters. The reaction may be effected in the presence or absence of catalysts of acid character such as acid ion exchange resins and minerals acids such as hydrochloric acid, phosphoric acid and perchloric acid. For the preparation of some esters, particularly of higher fatty acids or of aromatic acids, it may be advantageous to proceed by transesterification of the corresponding formates.

The reaction between the organic acid and the cyclododecatriene may be effected at a temperature between 20° and 200° C., the reactants preferably being heated under reflux for at least one hour. There is preferably employed a large excess of organic acid, the proportion varying from 2 to 20 times the theoretical quantity necessary for the preparation of the monoester. The reaction mass obtained is then treated to remove unreacted organic acid and any mineral acids employed as catalysts. For example, the organic layer consisting of a mixture of esters having different degrees of saturation can be taken up in water and extracted with an appropriate solvent such as diethyl ether, benzene, chloroform and carbon tetrachloride. The excess of organic acid may be distilled off after the reaction. The mixture of esters obtained, which still contains unreacted cyclododecatriene, is rectified by distillation in vacuo to remove excess triene and to separate the various fractions of esters, one of which has a high monoester content.

On saponification by the usual methods, the various ester fractions give alcohols. The monoester fraction obtained from the trans-trans-trans-triene gives trans-trans-cyclododeca-5,9-dien-1-ol, which may by recrystallised in order to obtain a completely pure substance. On the other hand, the monoester fraction obtained from the trans-trans-cis-triene gives a mixture of alcohols from which the constituents can be isolated by application of the usual methods. More especially, it is possible to separate the unsaturated alcohols by treating a solution of the mixture of alcohols with an aqueous silver nitrate solution.

The stereoisomeric cyclododeca-5,9-dien-1-ols obtained from the two forms of cyclododeca-1,5,9-triene in accordance with the present invention are substances having an odour resembling natural amber and can be used in perfumes. Both the esters and the alcohols of the invention may be used in the preparation of plasticizers for cellulose derivatives and vinyl polymers. The presence of two double bonds in the compounds of the invention imparts thereto interesting chemical properties, more especially a high reactivity which can be utilized in organic syntheses. For example, the alcohols can be chlorinated to produce derivatives of use as insecticides. Further, as previously mentioned, the alcohols may be hydrogenated to give cyclododecanol. For use in perfumery and in the production of plasticizers the mixture of cyclic $C_{12}$ alcohols obtained on saponification of the aforesaid esters may be used in crude form.

The following examples, in which the percentages given are by weight, will serve to illustrate the invention.

*Example 1*

Into a spherical flask provided with a stirrer and a reflux condenser are introduced:

417 g. trans-trans-trans-cyclododeca-1,5,9-triene, and
720 g. of 99.6% formic acid.

The mixture is heated under reflux with stirring for 2 hours, the unreacted formic acid is then distilled under reduced pressure and the residue is fractionated in vacuo. The following fractions are obtained:

265 g. unreacted cyclododecatriene,
22 g. intermediate fraction containing 49% of monoester (B.P. 86–91° C./1 mm. Hg), 92.5 g. monoester (B.P. 93–101° C./1 mm. Hg).
A residue of less volatile fractions.

The monoester yield is 53%, based on the cyclododecatriene used, its saponification number is 272 (theoretical for the monoformate 269) and its refractice index $n_D^{25}=1.4910$. Gravimetric analysis of the monoester gives the following results:

|  | Calculated for $C_{13}H_{20}O_2$ | Found |
|---|---|---|
| C, Percent | 75.04 | 73.02 |
| H, Percent | 9.7 | 9.97 |

Saponification of the monoester with a solution of sodium hydroxide in alcohol gives cyclododeca-trans-trans-5,9-dien-1-ol which on recrystallization from petroleum ether melts at 65–66° C. and gives a phenylurethane melting at 135–136° C.

*Example II*

The same procedure and proportions of reactants are used as described in Example I, but the trans-trans-trans-cyclododecatriene is replaced by its trans-trans-cis stereoisomer.

Distillation of the mixture obtained after the reaction gives:

188 g. unreacted cyclododecatriene (B.P. 87–89° C./3 mm. Hg), 62.5 g. intermediate fraction containing 31.8% of the monoformates of alcohols containing 12 carbon atoms atoms (B.P. 91–115° C./3 mm. Hg), 108 g. of a mixture of liquid monoesters having the following characteristics:

B.P. 119.5–122.5° C./3 mm. Hg,
Refractive index $n_D^{25}=1.4952$,
Content of monofromate of formula
$C_{13}H_{20}O_2$: 99.2%,
Hydrogen fixed by catalytic hydrogenation: 1.2 gram molecules (based on $C_{13}H_{20}O_2$).

The residue contains a mixture of esters of diods containing 12 carbon atoms and polymers of cyclododecatriene. The monoformate yield is 43.5% (based on the cyclododecatriene used).

Saponification of the formic ester obtained with an alcoholic solution of sodium hydroxide in alcohol gives a liquid mixture of alcohols having the following characteristics:

B.P. 128–130° C./5 mm. Hg,
$n_D^{25}=1.5152$.

20 grams of this mixture are dissolved in 100 cc. of cyclohexane and then extracted with 8 x 25 cc. of a 30% aqueous silver nitrate solution. The organic layer is evaporated and there is obtained 8.2 g. of a viscous liquid boiling at 122–125° C./4 mm. Hg. The liquid is subjected to catalytic hydrogenation and absorbs 0.5 mol of hydrogen (based on $C_{12}H_{20}O$). The product consists of a mixture of polycyclic alcohols containing 12 carbon atoms.

The aqueous silver nitrate layer is poured into 300 cc. of ammonia having a density of 0.925. 9 grams of product are precipitated, which melts at 37–47° C. and distills at 123–124.5° C./4 mm. Hg. A hydrogenation test made on an aliquot shows that 2 mols of hydrogen are absorbed (based on the formula $C_{12}H_{20}O$) to give a saturated product having an alcohol function, M.P. 80° C., which is identical with the cyclododecanol described by Kobelt, Barman, Prelog and Ruzicka in Helvetica Chimica Acta 32, p. 256 (1949).

On being reacted with phenyl isocyanate, the product of M.P. 37.47° C. gives a phenylurethane, M.P. 129.5–131.5° C., in a yield of 59%. On recrystallization, this phenylurethane melts at 135–136° C. Its gravimetric analysis gives the following results:

|  | Calculated for $C_{19}H_{25}O_2N$ | Found |
|---|---|---|
| C, Percent | 76.2 | 75.85 |
| H, Percent | 8.58 | 8.3 |

There is no depression of the melting point when this product is mixed with the phenylurethane described in Example I. The corresponding alcohol is therefore cyclododeca-trans-trans-5,9-dien-1-ol.

The remainder of the mixture of alcohols which does not precipitate as the phenylurethane consists of cis-trans- and trans-cis-cyclododeca-5,9-dien-1-ol.

*Example III*

The procedure of Example II is followed, but 0.3 g. of 65% perchloric acid is also added to the reaction mixture.

After reaction, the product is distilled and 153 g. of unreacted cyclododecatriene and 149.5 g. of monoformate (B.P. 118.5–123.5° C./3–4 mm. Hg) are recovered, which corresponds to a yield of 47%, based on the cyclododecatriene used.

*Example IV*

Into a spherical flask equipped with a stirrer and a reflux condenser there are introduced:

162 g. trans-trans-cis-cyclododeca-1,5,9-triene,
180 g. glacial acetic acid,
32.4 g. phosphoric acid ($d=1.7$).

The mixture is heated under reflux and with agitation for 24 hours. After cooling, the contents of the flask are poured into water and extracted with diethyl ether. The ethereal extract is then washed with water, dried and distilled under vacuum. The following fractions are obtained:

70.9 g. unreacted cyclododecatriene (B.P. 58–65° C./0.75 mm. Hg),
46.8 g. intermediate fraction containing 16.7% of the monoester (B.P. 66–105° C./0.75 mm. Hg),
38.7 g. monoester (B.P. 105–125° C./09 mm. Hg),
15.3 g. residue.

The monoester fraction has a monoacetate titre of 97.0%, corresponding to the formula $C_{14}H_{22}O_2$, and a refractive index $n_D^{25}=1.4902$.

*Example V*

Into a spherical flask, fitted with a stirrer and a reflux condenser there are introduced:

81 g. trans-trans-cis-cyclododeca-1,5,9-triene,
62.7 g. trifluoroacetic acid.

The mixture is heated under reflux with stirring for 6 hours. After cooling, the reaction mixture is taken up in 250 cc. of diethyl ether, the ethereal solution is washed with water until the washings have a pH of about 6 and then dried over anhydrous sodium sulphate. The ether is eliminated from the solution and then the solution is distilled to yield:

53.8 g. fraction, B.P. 61–117° C./0.6 mm. Hg,
50.7 g. blackish, very viscous residue.

Rectification of the first fraction under 0.5 mm. Hg gives:

14.6 g. fraction, B.P. 53–70° C., having a monoester titre of 51.5%,
10 g. fraction, B.P. 70.5–73° C., having a monoester titre of 95.2%,
23 g. monoester (B.P. 73–77° C.),
5.7 g. residue containing a mixture of mono- and di-esters.

The fraction boiling at 73–77° C. has a monotrifluoroacetate titre of 98.5%, corresponding to the formula $C_{14}H_{19}O_2F_3$, and a refractive index $n_D^{25}=1.4450$.

I claim:
1. An ester of trans-trans-cyclododeca-5,9-dien-1-ol with an acid selected from the class consisting of formic, acetic and trifluoroacetic acids.
2. The esters of a mixture of the stereoisomers cis-trans-cyclododeca-5,9-dien-1-ol and trans-cis-cyclododeca-5,9-dien-1-ol with an acid selected from the class consisting of formic, acetic and trifluoroacetic acids.
3. Trans-trans-cyclododeca-5,9-dien-1-ol.
4. A mixture of stereoisomers cis-trans-cyclododeca-5,9-dien-1-ol and trans-cis-cyclododeca-5,9-dien-1-ol.

References Cited in the file of this patent

UNITED STATES PATENTS

| | | |
|---|---|---|
| 2,426,725 | Bruson | Sept. 2, 1947 |
| 2,598,263 | Johnson | May 27, 1952 |
| 2,764,610 | Kuder | Sept. 25, 1956 |
| 2,875,244 | Bartlett et al. | Feb. 24, 1959 |

OTHER REFERENCES

Wilke (Angew. Chemie 69, 397–398 (1957)).